Feb. 2, 1960   D. LIFTMAN   2,923,025
UTENSIL CLEANING ACCESSORY
Filed Dec. 6, 1957
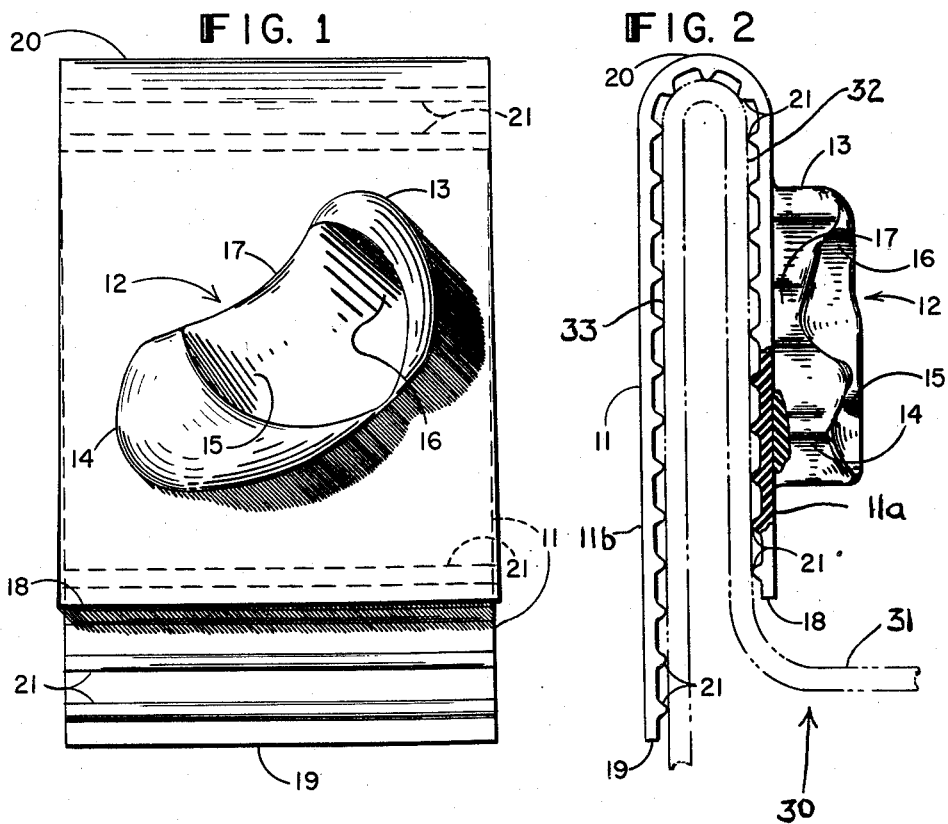
INVENTOR.
DAVID LIFTMAN
BY
ATTORNEY.

2,923,025
UTENSIL CLEANING ACCESSORY

David Liftman, Lynn, Mass.

Application December 6, 1957, Serial No. 701,053

3 Claims. (Cl. 15—268)

This invention relates to a utensil-cleaning accessory. In particular, it relates to such an accessory which in combination with a sink enables the user to have firm and proper support for cleaning of pots, pans and the like.

Proper cleaning of pots and pans requires the operator to hold the utensil in one hand and perform the scouring with the other hand. It is difficult to maintain a utensil in any one position in the sink because of the surface smoothness of both the sink and the utensil. It is far more difficult and awkward to maintain the utensil in a somewhat vertical position which is normally preferable for scouring.

An object of this invention is to provide a novel utensil support which will enable the user to have firm support for the utensil in a sink at a somewhat vertical position and thus considerably improve the efficiency of cleaning and avoid much of the weariness attendant upon scouring of pots and pans.

Further objects and a fuller understanding of the invention will hereinafter appear from the following description of a preferred embodiment illustrative of the invention and shown in the accompanying drawings in which Fig. 1 is a front view showing the device in a folded position, Fig. 2 is a side view partly broken away showing the device in position on a sink.

The invention comprises generally an elongated flexible mat made of rubber or plastic and having a supporting portion adapted to engage the front inner surface of the sink and a positioning portion adapted to engage the front outer surface of the sink. Integral with the supporting portion is an abutment extending outwardly from the upper surface. The abutment has a receptacle shaped to receive part of the utensil and thus support it. The under surface of the entire mat has projections which give firm purchase to the mat on the sink. On its upper surface the abutment is preferably concave and is shaped to position, for scouring purposes, a section of the lower edge of a pot held manually therein. The abutment in this case has sides substantially perpendicular to the mat, one side at least being concave and adapted to resist the pressure of a pot manually held against it.

On the under side of the mat the projections may be in the form of ridges or the like to resist slipping when the mat is folded and positioned over the front portion of a sink, with the supporting portion inside the sink and the positioning portion outside of the sink.

Referring to the drawings, the device therein shown as illustrative of one embodiment of my invention, comprises an elongated flexible rubber mat 11 having a supporting portion 11a and a positioning portion 11b. Extending outwardly from the supporting portion 11a is an integral abutment 12, with an upper end 13, a lower end 14, an outer concave receiving surface 15 and 16, and a concave top side 17. The supporting portion has an end 18 and the positioning portion has an end 19. The abutment 12 is positioned adjacent the end 18. The mat when placed on the sink is folded approximately at 20. On the bottom of the mat there are a multiplicity of projections which may be in the form of ridges 21. The device is applied to a sink 30, with a bottom 31, an inner front surface 32, and an outer front surface 33.

In operation, the mat is folded as at 20 and draped over the front of a sink, with the end 18 in the sink and end 19 outside of the sink and with the projections 21 of the supporting end in contact with the inner sink front 32 and the projections 21 of the positioning end in contact with the outer sink front 33. The projections prevent movement of the mat and abutment when moderate pressure is exerted against the abutment. The person employing this device may, when required, lean against the mat portion in contact with the outer sink front and prevent movement of the mat and abutment when greater pressure is applied.

A pot to be scoured is, for example, held in the left hand of the operator and a section of the lower outer edge of the pot placed in the concavity 15—16 on the outer receiving surface of abutment 12 where it is positioned firmly in place during the right hand scouring operation.

Similarly, the concave top side 17 may be used as an abutment for the rim of a pot when the bottom of the pot is being scoured.

The abutment may be located in a symmetrically reverse position for the convenience of a left handed operator.

While the preferred embodiment of my invention has been described in detail, it will be understood that I do not wish to be limited to the particular construction set forth, since various changes in the form, material, proportion, and arrangement of parts, and in the details of construction may be resorted to without departing from the spirit and scope of the invention, or destroying any of the advantages contained in the same, heretofore described and defined in the following claims.

I claim:

1. A utensil-cleaning accessory adapted to be used in conjunction with a sink, comprising an elongated flexible mat transversely foldable in its central section, having a supporting portion adapted to engage the front inner surface of the sink, an overlapping positioning portion adapted to engage the front outer surface of the sink and be held in position by bodily pressure, and a firm integral boss abutment extending obliquely and outwardly from the upper surface and adjacent to the end of said supporting portion; said abutment having a rounded upper end, a rounded lower end, a concave top side, a convex bottom side and an outer receiving surface, said outer receiving surface being concave and extending between said top side and said bottom side, said surface being adapted to receive a portion of a utensil, the lower surface of said mat being provided with a multiplicity of raised projections.

2. A utensil-cleaning accessory comprising an elongated flexible mat transversely foldable in its central section having a supporting portion, an overlapping positioning portion adapted to be held in position by bodily pressure and a firm integral boss extending obliquely and outwardly from the upper surface and adjacent to the end of said supporting portion; said abutment having a rounded upper end, a rounded lower end, a concave top side, and a convex bottom side; said abutment having a top utensil receiving portion extending from said top side to said bottom side and abutment sides substantially perpendicular to said mat; the lower surface of said mat being provided with a multiplicity of raised projections adapted to engage the adjacent inner and outer surfaces of a sink.

3. A pot-cleaning accessory comprising an elongated flexible mat transversely foldable in its central section having a supporting portion, an overlapping positioning portion adapted to be held in position by bodily pressure, and a firm boss abutment extending obliquely and outwardly from the upper surface and adjacent to the end of said supporting portion; said abutment having a rounded upper end and a rounded lower end, a concave outer receiving surface, a convex bottom abutment side and a concave top abutment side; the concavity of said outer receiving surface being formed to accommodate a section of the lower edge of a pot; said concave top side being formed to accommodate a section of the upper rim of a pot; said concave top side facing away from the end of said supporting portion; the lower surface of said mat being provided with a multiplicity of raised projections adapted to engage the adjacent inner and outer surfaces of a sink.

References Cited in the file of this patent

UNITED STATES PATENTS

| | | |
|---|---|---|
| 1,510,647 | Bomar | Oct. 7, 1924 |
| 1,806,103 | Tyler | May 19, 1931 |
| 2,569,247 | Mazzola | Sept. 25, 1951 |
| 2,596,735 | Suarez | May 13, 1952 |
| 2,691,237 | Heim | Oct. 12, 1954 |

FOREIGN PATENTS

| | | |
|---|---|---|
| 426,871 | Great Britain | Apr. 5, 1935 |